(12) United States Patent
Warren et al.

(10) Patent No.: US 10,690,475 B2
(45) Date of Patent: Jun. 23, 2020

(54) ENCAPSULATED FAN CAP PROBE

(71) Applicant: UNITED TECHNOLOGIES CORPORATION, Farmington, CT (US)

(72) Inventors: Eli Cole Warren, Wethersfield, CT (US); Joon K. Kim, Norwalk, CA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 398 days.

(21) Appl. No.: 15/440,946

(22) Filed: Feb. 23, 2017

(65) Prior Publication Data
US 2018/0238673 A1     Aug. 23, 2018

(51) Int. Cl.
| G01B 7/14 | (2006.01) |
|---|---|
| F04D 29/52 | (2006.01) |
| F04D 29/00 | (2006.01) |
| F04D 27/00 | (2006.01) |
| F01D 17/04 | (2006.01) |
| F01D 17/06 | (2006.01) |
| F01D 21/00 | (2006.01) |

(Continued)

(52) U.S. Cl.
CPC ............... *G01B 7/14* (2013.01); *F01D 17/02* (2013.01); *F01D 17/04* (2013.01); *F01D 17/06* (2013.01); *F01D 17/08* (2013.01); *F01D 17/085* (2013.01); *F01D 21/003* (2013.01); *F04D 27/001* (2013.01); *F04D 29/526* (2013.01); *F05D 2220/32* (2013.01); *F05D 2260/83* (2013.01); *Y02T 50/671* (2013.01)

(58) Field of Classification Search
CPC . G01B 7/14; F01D 17/04; F01D 17/08; F01D 17/06; F01D 21/003; F01D 17/085; F01D 17/02; F04D 27/001; F04D 29/526; Y02T 50/671; F05D 2220/32; F05D 2260/83
See application file for complete search history.

(56) References Cited

U.S. PATENT DOCUMENTS

| 5,140,494 | A | * | 8/1992 | Slade | ...................... F01D 21/04 |
|---|---|---|---|---|---|
| | | | | | 324/660 |
| 5,166,626 | A | * | 11/1992 | Hester | ...................... G01B 7/14 |
| | | | | | 324/683 |

(Continued)

FOREIGN PATENT DOCUMENTS

| EP | 3018445 A1 | 5/2016 |
|---|---|---|
| GB | 2449709 A | 12/2008 |
| GB | 2468686 A | 9/2010 |

OTHER PUBLICATIONS

European Search Report for Application No. 18158214.9-1006; dated Jun. 6, 2018; 8 pgs.

(Continued)

*Primary Examiner* — Lee E Rodak
(74) *Attorney, Agent, or Firm* — Cantor Colburn LLP

(57) ABSTRACT

Disclosed is a probe including a housing; a plurality of axially stacked caps disposed within the housing, the plurality of stacked caps including an inner cap and an outer cap, a probe sensor fixedly disposed between the inner cap and an axial bottom of the housing, and an electronic lead connected to the probe sensor and axially extending through the plurality of caps to an exterior of the probe.

11 Claims, 4 Drawing Sheets

(51) Int. Cl.
*F01D 17/08* (2006.01)
*F01D 17/02* (2006.01)

(56) References Cited

U.S. PATENT DOCUMENTS

| | | | | |
|---|---|---|---|---|
| 5,973,502 A | * | 10/1999 | Bailleul | G01B 7/14 |
| | | | | 324/662 |
| 8,451,459 B2 | * | 5/2013 | Hynous | G01B 11/026 |
| | | | | 356/614 |
| 2009/0128166 A1 | | 5/2009 | Webster | |
| 2014/0064926 A1 | * | 3/2014 | Warren | F01D 11/20 |
| | | | | 415/118 |
| 2016/0195411 A1 | * | 7/2016 | Ford | F01D 17/02 |
| | | | | 415/118 |

OTHER PUBLICATIONS

European Office Action; Application No. 18158214.9; dated Mar. 12, 2020; 7 pages.

* cited by examiner

US 10,690,475 B2

ENCAPSULATED FAN CAP PROBE

BACKGROUND

Exemplary embodiments of the present disclosure pertain to the art of mounting structures, and in particular to mounting a probe to a fan case liner.

In order to validate a fan design for a gas turbine engine, blade-tip clearance data can be achieved by collecting data with capacitance-based probes. With stationary fan case liners, probes may be bolted directly to the fan case. Conforming liners move relative to the case, so there is a need to secure a probe to a conforming liner in order to gather appropriate blade-tip clearance data.

BRIEF DESCRIPTION

Disclosed is a probe including a housing, a plurality of axially stacked caps disposed within the housing, the plurality of stacked caps including an inner cap and an outer cap, a probe sensor fixedly disposed between the inner cap and an axial bottom of the housing, and an electronic lead connected to the probe sensor and axially extending through the plurality of caps to an exterior of the probe.

In addition to one or more of the features described above, or as an alternative, further embodiments may include that the probe sensor is disposed axially between an inner insulator and an outer insulator.

In addition to one or more of the features described above, or as an alternative, further embodiments may include that a conducting strap connects the electronic lead to the probe sensor, and brazing secures the electronic lead to the inner cap.

In addition to one or more of the features described above, or as an alternative, further embodiments may include that the inner cap has a radially centered inner lead opening and the outer cap has a radially centered outer lead opening.

In addition to one or more of the features described above, or as an alternative, further embodiments may include that the axial bottom of the housing includes a radially inwardly facing lip, and an axial bottom of the outer cap is axially downwardly biased.

In addition to one or more of the features described above, or as an alternative, further embodiments may include that an axial top of the housing includes a radially outwardly facing lip.

In addition to one or more of the features described above, or as an alternative, further embodiments may include that the housing and outer cap have a cylindrical shape and are at least mostly hollow.

In addition to one or more of the features described above, or as an alternative, further embodiments may include that the probe sensor is a circuit board sensor.

Further disclosed is a gas turbine engine, including a fan liner having an opening and a probe disposed within the opening, wherein the probe sensor may include one or more of the above disclosed features. Further disclosed is a method of positioning a probe in a gas turbine engine, including fixedly disposing a probe sensor in an opening in a fan case liner, wherein the probe sensor may include one or more of the above disclosed features.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
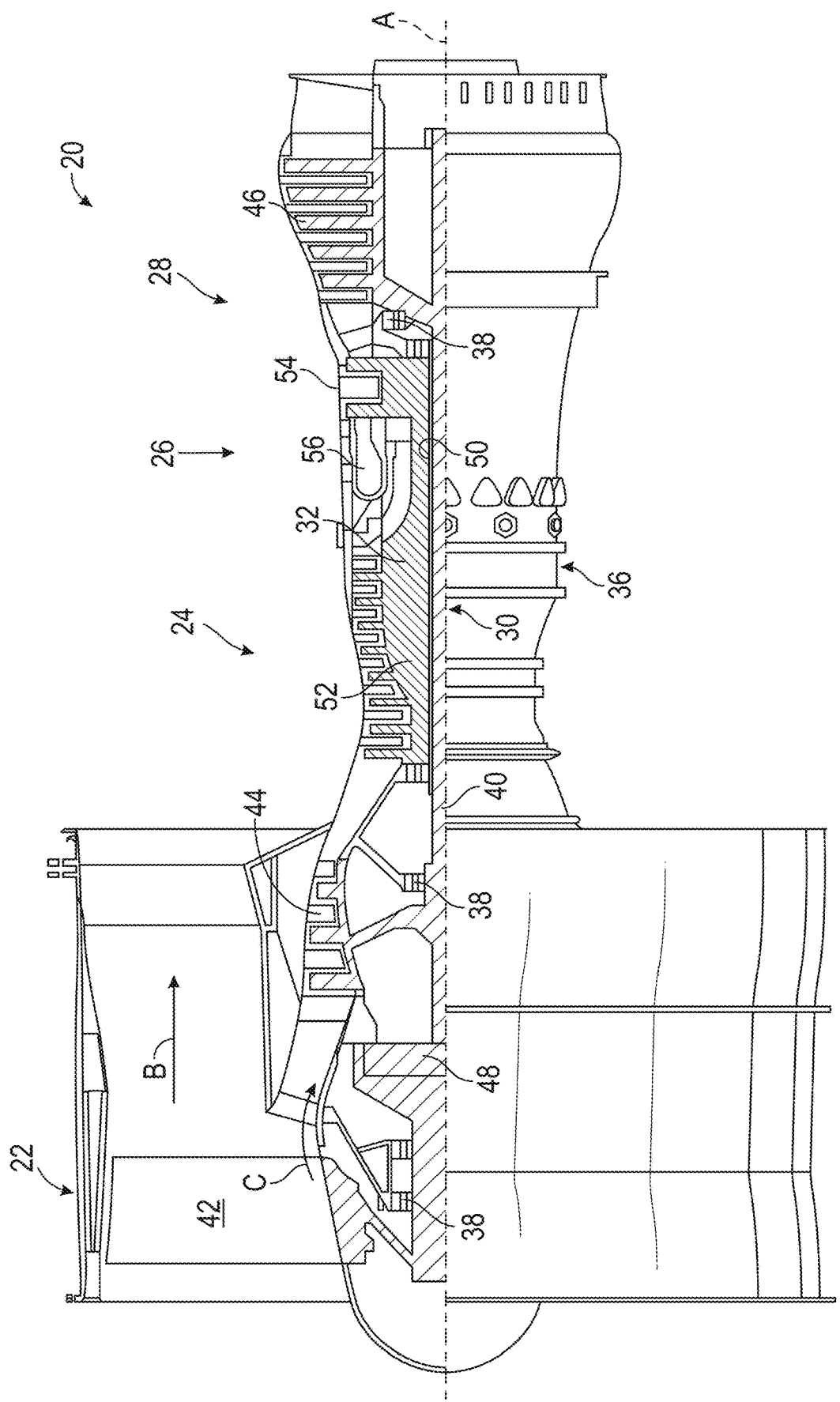
FIG. 1 is schematic illustration of a gas turbine engine according to the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
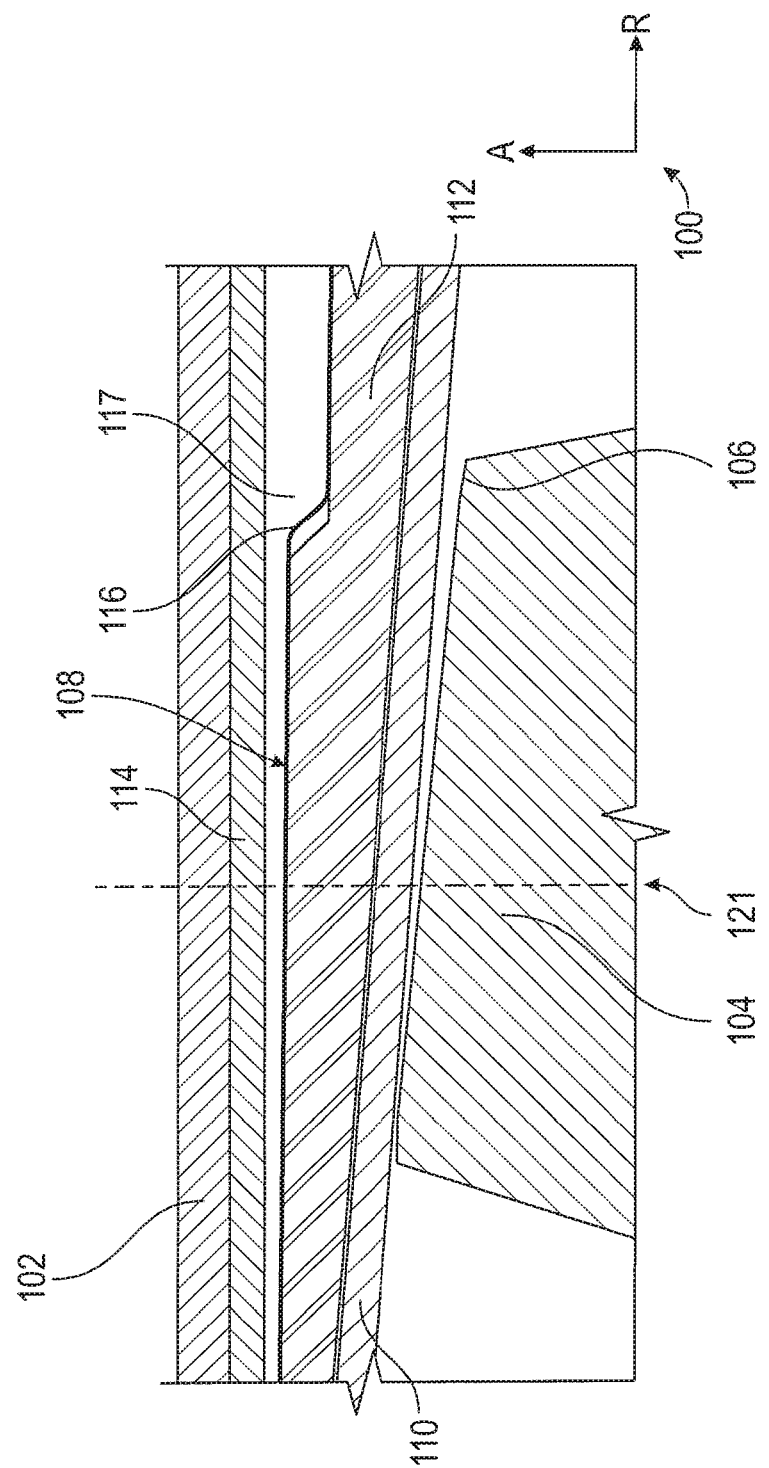
FIG. 2 illustrates a conforming liner of a fan case according to the disclosure.
Figure 3:
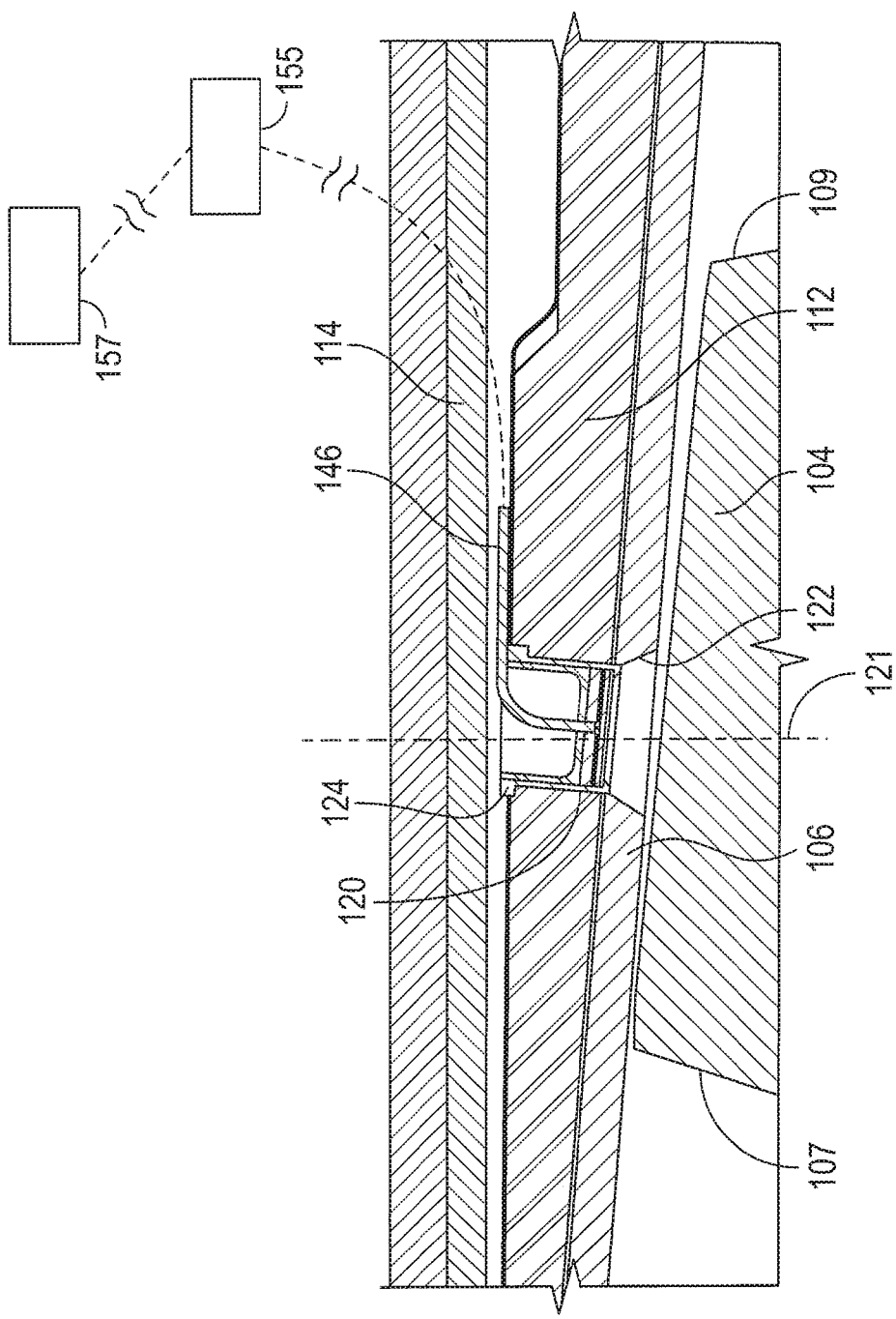
FIG. 3 illustrates a conforming liner of a fan case with a blade tip probe according one embodiment of the disclosure.

Turning now to FIGS. 2 and 3, embodiments of the disclosure may be identified with reference to axis 100, where the abscissa represents the radial (R) direction and the ordinate represents the axial (A) direction. To facilitate discussion of the disclosed embodiments, the coordinates applied herein are shifted by ninety degrees compared with a typical coordinate system for a gas turbine engine, where the axial direction typically extends along the centerline of the engine.

As illustrated, the fan may be housed in a fan case 102. The fan may have a fan blade 104 with an axial outer blade tip 106, the tip being between a blade leading edge 107 and a blade trailing edge 109. A conforming liner 108, which moves relative to the case 102, may be axially disposed between the fan case 102 and the fan tip 106.

A first layer 110 of the liner 108, axially spaced from the blade tip 106, may be an abradable material. A second layer 112 of the liner 108, axially outside of the abradable layer 110, may be a honeycomb bulk material. A third layer 116 of the liner 108, which may be a metallic sheet, may be axially outside of the second layer 112 and function as mechanical support for liner 108.

A containment layer 114, which may be made of Kevlar, may be provided axially against the case 102. A gap 117 may be provided axially between the containment layer 114 and liner 108.

In one embodiment, and as illustrated in FIG. 3, the conforming liner 108 may include an axially extending liner opening 120, which may be located at a desired station 121 of measurement in the liner 108 relative to the blade tip 106. The opening 120 may have a cylindrical profile, with a long axis of the opening 120 extending in the axial direction, coincident with the desired measurement location 121. An axial inner end 122 of the opening 120, facing the blade tip 106, may have a chamfered edge providing space for the electrical field of the sensor electronics 132. The diameter of the opening 120 may enable fitting of the probe 124 into the liner 108, discussed in greater detail below.

Figure 4:
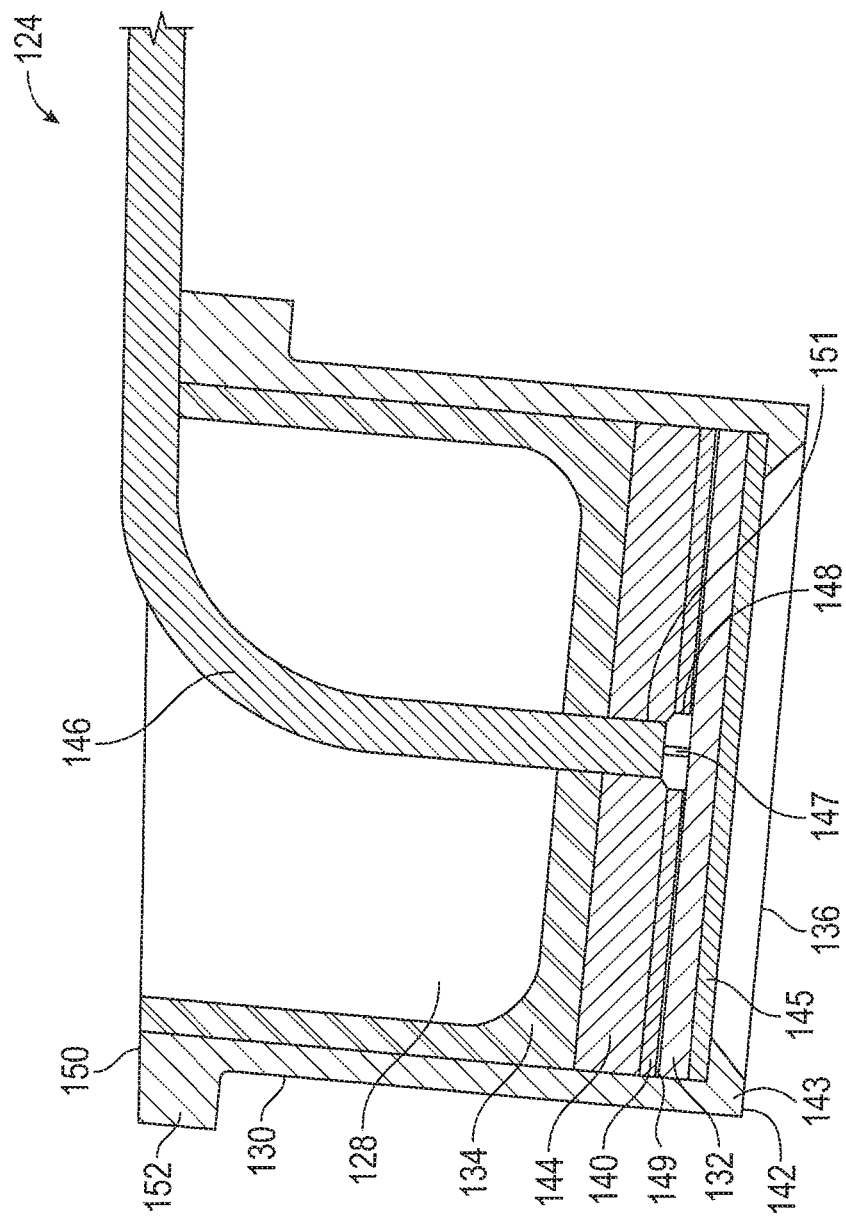
FIG. 4 illustrates a blade tip probe according one embodiment of the disclosure.

Turning now to FIG. 4, the probe 124 may include a probe housing 130 that may seat the probe 124 within the liner opening 120. The housing 130 may contain all components identified below and provides an egress path for an electrical lead 146 onto the liner 108. The housing 130 may be mostly hollow and have a generally cylindrical shape, though other shapes fall within the scope of the disclosed embodiments. The housing 130 may have an inner diameter sized to fit probe sensor electronics 132, which may be a circuit board sensor.

An axial top 150 of the housing 130 may be formed with a radially outwardly facing upper lip or flange 152 that seats the housing 130 so that the flange 152 is at the axial top of the liner opening 120 and the housing 130 extends into the liner opening 120. The housing 130 may have an axial length sized to fit within the liner opening 120, and fit between, but not extend into, the abradable material layer 106 and the containment layer 106. An axial bottom 142 of the housing 130 may have an axial bottom opening 136 through which the probe fluidly communicates with the environment. The bottom opening 136 of the housing 130 may include a radially inwardly facing bottom lip or flange 143 to seat the probe sensor electronics 132. With this configuration, the inner flange 143 may secure internal components and the outer flange 152 may provide fitment between the housing 130 and the liner 108.

Within the 130 housing, an electrical lead 146, which may include sensor wire 147, may be connected to the probe sensor electronics 132, via a weld, to a conductor strap 149 disposed axially between the sensor electronics 132 and an axial outer insulator 140. An axial inner cap 144 may be axially spaced from the bottom flange 143 by a distance that allows for the positioning of probe sensor electronics 132 and the conductor strap 149 between an axial inner insulator 145 and the axial outer insulator 140. The inner cap 144 may position the electrical lead 146 in proximity to sensor electronics 132 by brazing.

An axial outer cap 128 may be disposed axially between the inner cap 144 and the top 152 of the housing 130. The outer cap 128 may also be cylindrically shaped to conform to the shape of housing 130, and the inner cap 144 may be mostly hollow. The outer cap 128 may have an axial bottom surface 134 positioned against the inner cap 144. The outer cap 128 may transmit an assembly preload to internal components against the inner flange 143 of the housing 130.

The wall thicknesses of the housing 130, outer cap 128 and inner cap 144 may be based on material type. The material type may be aluminum for weight saving purposes, though other suitable materials are within the scope of the present disclosure.

The electrical lead 146 may extend from the probe sensor electronics 132 through an axial inner lead opening 148 in the radial center of the inner cap 144 and through an axial outer lead opening 151 in the radial center of the outer cap 128. The electrical lead 146 may be brazed to the inner cap 144 at the outer lead opening 151. From there, as illustrated in FIG. 3, the electrical lead 146 may connect with the outer metallic layer 116 of the liner 108. With this configuration, the electrical lead 146 may be secured on metallic layer 116 of liner 108, egressed through case 102, illustrated schematically in FIG. 3, and connected to conditioning units 155 allowing transmission of received signals to conditioning units 155, such as a capacitance-to-voltage converter that transmits a signal to a common data system and the like, as illustrated in FIG. 3. The conditioning units 155 communicate with one or more controllers 157 for analyzing the transmitted signals.

With the disclosed embodiments, the outer insulator 140 may provide insulation between conductors, which includes the sensor wire 147, the strap 149 and the sensor electronics 132, and a ground-plane, which may include the combination of the inner cap 144, the outer cap 128 and the housing 130. The sensor electronics 132 may provide a blade-pass signal, by a change in capacitance electronics via the sensor wire 147 and electrical lead 146. The inner insulator 145 may provide electrical insulation between sensor electronics 132 and the bottom flange 143 of the housing 130, i.e., the ground-plane.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A probe comprising:
   a housing;
   the housing being cylindrical and hollow with an axial top and an axial bottom;
   the axial top including a radially outward extending top flange;
   the axial bottom including an opening, the opening including a radially inner facing bottom flange;
   a plurality of axially stacked caps disposed within the housing, the plurality of stacked caps including:
   an inner cap axially spaced from the bottom flange, the inner cap including a radial center opening configured to position an electrical lead proximate to probe sensor electronics, wherein the probe sensor electronics are located between an axial inner insulator and an axial outer insulator, wherein the axial inner insulator is entirely on an axial inner side of the probe and the axial outer insulator is entirely on an axial outer side of the probe; and
   an outer cap that is cylindrical, hollow, cup shaped, and shaped to conform with a shape of the housing, and has an axial bottom surface positioned axially against the inner cap, the axial bottom surface including a radial center opening configured for positioning an electronic lead therethrough;
   the probe sensor electronics fixedly disposed axially between the inner cap and the axial bottom of the housing; and
   the electronic lead being positioned to extend into the housing, through the axial outer cap, the axial inner cap, and the axial outer insulator, and the electronic lead includes a sensor wire extending therefrom that is connected to the probe sensor electronics.

2. The probe of claim 1, wherein the electronic lead is connected by the sensor wire to the probe sensor electronics via a conductor strap positioned axially between the probe sensor electronics and the axial outer insulator.

3. The probe sensor of claim 2, wherein brazing secures the electronic lead to the inner cap.

4. The probe of claim 1, wherein the probe sensor electronics comprises a circuit board sensor.

5. A gas turbine engine comprising:
   a fan liner having an opening and a probe disposed within the opening, wherein the probe comprises:
   a housing;
   the housing being cylindrical and hollow with an axial top and an axial bottom;
   the axial top including a radially outward extending top flange;
   the axial bottom including an opening, the opening including a radially inner facing bottom flange;
   a plurality of axially stacked caps, the plurality of stacked caps including:
   an inner cap axially spaced from the bottom flange, the inner cap including a radial center opening configured to position an electrical lead proximate to probe sensor electronics, wherein the probe sensor electronics are located axially between an axial inner insulator and an axial outer insulator, wherein the axial inner insulator is entirely on an axial inner side of the probe and the axial outer insulator is entirely on an axial outer side of the probe; and
   an outer cap that is cylindrical, hollow, cup shaped and shaped to conform with a shape of the housing, and has an axial bottom surface positioned axially against the inner cap, the axial bottom surface including a radial center opening configured for positioning an electronic lead therethrough;
   probe sensor electronics fixedly disposed between the inner cap and the axial bottom of the housing; and the electronic lead being positioned to extend into the housing, through the axial outer cap, the axial inner cap, and the axial outer insulator, and the electronic lead includes a sensor wire extending therefrom that is connected to the probe sensor electronics.

6. The gas turbine engine of claim 5, wherein the electronic lead is connected by the sensor wire to the probe sensor electronics via a conductor strap positioned axially between the probe sensor electronics and the axial outer insulator.

7. The gas turbine engine of claim 6, wherein brazing secures the electronic lead to the inner cap.

8. The gas turbine engine of claim 5, wherein the probe sensor electronics comprise a circuit board sensor.

9. The gas turbine engine of claim 5, wherein the liner has an abradable layer and a layer of bulk material, and wherein an axial bottom end of the probe is disposed within the bulk material.

10. A method of positioning a probe in a gas turbine engine, comprising:
fixedly disposing a probe sensor in an opening in a fan case liner, wherein the probe sensor includes:
a housing;
the housing being cylindrical and hollow with an axial top and an axial bottom;
the axial top including a radially outward extending top flange;
the axial bottom including an opening, the opening including a radially inner facing bottom flange;
a plurality of axially stacked caps, the plurality of stacked caps including:
an inner cap axially spaced from the bottom flange, the inner cap including a radial center opening configured to position an electrical lead proximate to probe sensor electronics, wherein the probe sensor electronics are located axially between an axial inner insulator and an axial outer insulator, wherein the axial inner insulator is entirely on an axial inner side of the probe and the axial outer insulator is entirely on an axial outer side of the probe; and
an outer cap that is cylindrical, hollow, cup shaped and shaped to conform with a shape of the housing, and has an axial bottom surface positioned axially against the inner cap, the axial bottom surface including a radial center opening configured for positioning an electronic lead therethrough;
the probe sensor electronics fixedly disposed between the inner cap and the axial bottom of the housing; and
the electronic lead being positioned to extend into the housing, through the axial outer cap, the axial inner cap, and the axial outer insulator, and the electronic lead includes a sensor wire extending therefrom that is connected to the probe sensor electronics.

11. The method of claim 10, wherein the electronic lead is connected by the sensor wire to the probe sensor electronics via a conductor strap positioned axially between the probe sensor electronics and the axial outer insulator.

* * * * *